Figure 1:
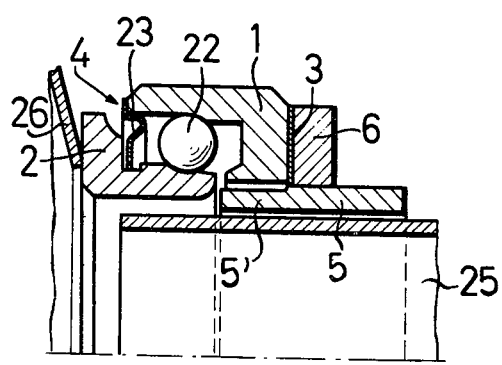

# United States Patent [19]

Limbacher et al.

[11] 3,882,979

[45] May 13, 1975

[54] SELF-ALIGNING CLUTCH RELEASE BEARING ARRANGEMENT

[75] Inventors: Bernhard Limbacher; Kurt Fadler, both of Schweinfurt am Main, Germany

[73] Assignee: Fichtel & Sachs AG, Schweinfurt am Main, Germany

[22] Filed: June 14, 1973

[21] Appl. No.: 370,044

[30] Foreign Application Priority Data

June 24, 1972 Germany.............................. 2230992

[52] U.S. Cl. ............... 192/98; 192/110 B; 192/30 V
[51] Int. Cl... F16d 19/00; F16d 23/00; F16d 13/60
[58] Field of Search ................ 192/98, 110 B, 30 V; 308/184, 233, 235

[56] References Cited
UNITED STATES PATENTS

| | | | |
|---|---|---|---|
| 2,785,023 | 3/1957 | Naumann........................ | 308/233 X |
| 3,604,545 | 9/1971 | Bourgeois............................. | 192/98 |
| 3,625,327 | 12/1971 | Birdsey .............................. | 192/98 X |
| 3,741,361 | 6/1973 | Brandenstein.................... | 192/110 B |
| 3,744,607 | 7/1973 | Hausinger............................. | 192/98 |
| 3,801,171 | 4/1974 | Rozentals............................ | 308/184 |

*Primary Examiner*—Samuel Scott
*Assistant Examiner*—Lance W. Chandler
*Attorney, Agent, or Firm*—Hans Berman; Kurt Kelman

[57] ABSTRACT

A release bearing for an automotive friction clutch in which the normally stationary outer bearing ring is mounted on a carrier sleeve with sufficient radial clearance for permitting radial movement of the ring toward and away from a position in which the respective axes of the ring and sleeve coincide, thereby compensating for misalignment between the axis of rotation of the clutch release levers and that of the inner bearing ring which abuttingly engages the levers during disengagement of the clutch. The outer bearing ring is axially secured on the carrier sleeve near a guide face perpendicular to the axis of the latter with sufficient clearance to minimize friction between the guide face and the bearing ring during radial compensating movement of the bearings.

14 Claims, 7 Drawing Figures

SELF-ALIGNING CLUTCH RELEASE BEARING ARRANGEMENT

This invention relates to release bearing for friction clutches of the type commonly employed in automotive vehicles, and particularly to a self-aligning clutch release bearing arrangement which automatically compensates for misalignment of the axis of rotation of the releasing levers and like elements of the clutch, and the axis of the carrier sleeve on which the bearing rings are mounted.

It has been proposed in the German published application No. 1,600,080 to receive the outer, stationary bearing ring of a clutch release bearing between respective faces of two guide elements mounted on the csrrier sleeve of a clutch release bearing, the faces being perpendicular to the sleeve axis. A cup spring axially biases the bearing ring into engagement with a friction element on one of the guide elements.

The known arrangement is effective in compensating for misalignment, but relatively complex, and it is an object of the invention to provide a simpler self-aligning clutch release bearing arrangement which is at least as effective, but less costly than the known device.

The invention thus resides in an improvement in the conventional clutch release bearing arrangement in which bearing elements of circular cross section are angularly distributed about the common axis of a first bearing ring and a second bearing ring and interposed between the two rings in simultaneous rolling engagement for relative rotation of the bearing rings, the first bearing ring being mounted on a tubular carrier which permits the bearing rings to be moved axially toward and away for the release levers or like devices of a friction clutch so that an exposed abutment face of the second bearing ring radially extending relative to the aforementioned common axis may engage the release elements of the clutch and thereby disengage the clutch.

The invention provides a mounting arrangement which mounts the first bearing ring on the carrier member with sufficient radial clearance for permitting radial movement of the bearing ring toward and away from a position in which the common axis of the two bearing rings and the axis of the carrier member coincide. The mounting arrangement includes a guide face on the carrier member perpendicular to the axis of the latter, and means for axially securing the first bearing ring contiguously adjacent the guide face with sufficient clearance to minimize friction between the guide face and the first bearing ring during the radial movement.

Figure 4:
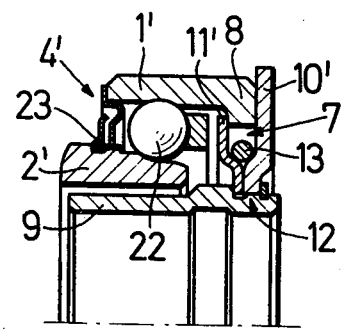
Figure 5:
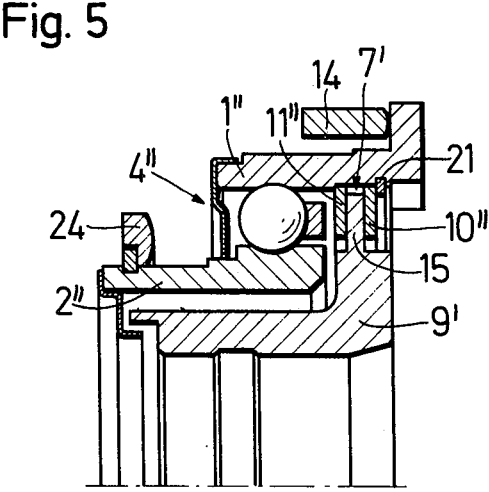
Figure 6:
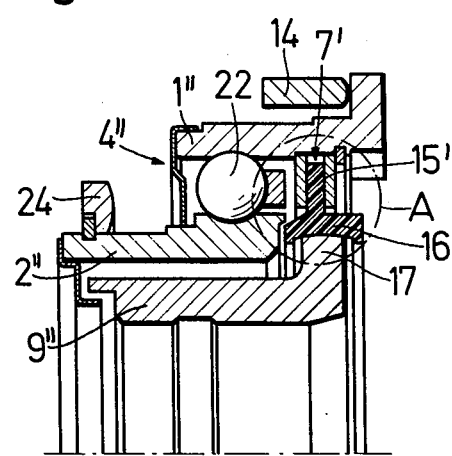
Figure 7:
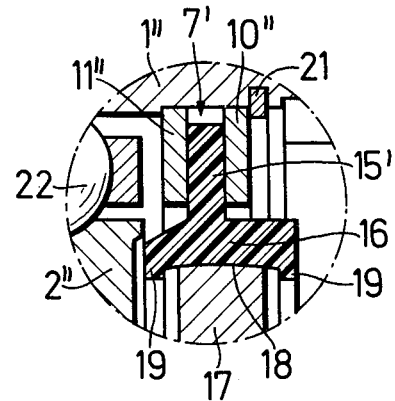

Other features, additional objects, and many of the attendant advantages of this invention will readily be appreciated as the same becomes better understood by reference to the following detailed description of preferred embodiments when considered in connection with the appended drawing in which:

FIGS. 1 to 6 show respective halves of clutch release bearing arrangements of the invention in section on the axis of rotation of the anti-friction bearing in each arrangement; and FIG. 7 shows the portion of the device of FIG. 6 circled by a chain-dotted line A on a larger scale.

Referring initially to FIG. 1, there is shown as much of the drive train of an automotive vehicle as is needed for an understanding of this invention which resides mainly in the clutch release bearing arrangement.

A supporting tube 25 extends from the transmission housing of an automotive vehicle, not otherwise shown, toward the associated clutch of which only a portion of a diaphragm spring 26 is seen in the drawing. A generally cylindrical carrier sleeve 5 is axially slidably mounted on the tube 25 and is held in the illustrated position by a clutch release fork, as is conventional in itself and not seen in FIG. 1. A flange 6 is fixedly fastened on the sleeve 5 and projects radially outward therefrom. It has a face 3 which is perpendicular to the axis of the sleeve 5 and guides an outer bearing ring 1 of a ball bearing assembly 4, the ring 1 being approximately L-shaped in the axial section of FIG. 1.

The shorter, radial leg of the L-shape is radially guided on the face 3 toward and away from a position in which the axis of the ring 1 coincides with that of the sleeve 5, an axially terminal portion 5' of the sleeve 5 being of reduced external diameter to provide the necessary clearance for the radial movement of the bearing ring 1.

Bearing balls 22, of which only one is seen in FIG. 1, are equiangularly distributed about the axis of the ring 1 in simultaneous rolling engagement with the outer ring 1 and an axially coextensive inner bearing ring 2 which also is approximately L-shaped in section, the bearing balls 22 being interposed radially between the longer legs of both L-shapes. The shorter leg of the L-shape in the inner ring 2 has an exposed, radial abutment face engaged 26 light axial pressure by the diaphragm spring 26 which is almost fully relaxed in the illustrated, engaged condition of the clutch. A labyrinth seal 23 prevents contamination of the bearing balls 22 by dust.

A film of lubricant, too light to permit pictorial representation on the scale of FIG. 1, covers the guide face 3 of the flange 6 and provides the clearance necessary to minimize friction between the outer bearing 1 and the guide face 3 under the light pressure of the spring 26. The spring pressure is not sufficiently increased to displace the lubricant film when the sleeve 5 is shifted toward the left, as viewed in FIG. 1, by the obscured release fork, thereby to tilt the spring 26 and to release the clutch.

The bearing illustrated in FIG. 1 consists of two parts or subassemblies held together only by the pressure of the spring 26 and the backing of the non-illustrated clutch release fork. The inner bearing ring 2 is in constant engagement with the spring 26 and rotates as long as the non-illustrated engine connected to the clutch is operated.

The clutch release arrangement shown in FIG. 1 operates noiselessly and compensates automatically for any radial misalignment between the axis of rotation of the diaphragm spring 26 and the geometrical axis of the sleeve 5 which is secured against rotation by the non-illustrated fork. The friction between the outer bearing ring 1 and the guide face 3 is minimal so that the forces exerted by the diaphragm on the inner ring 2 in an asymmetrical manner in the case of misalignment can shift the entire bearing assembly 4 radially on the carrier sleeve 5 away from the illustrated position in which the bearing axis and the sleeve axis coincide, the radial clearance between the ring 1 and the carrier sleeve 5 being amply sufficient to permit movement of the bearing assembly 4 until its axis coincides at least approximately with the axis of rotation of the spring 26.

The modified clutch release bearing arrangements of the invention illustrated in FIGS. 2 to 7 are fully assembled prior to installation, and they do not rely on elements of the clutch proper or of the release actuating mechanism for being held together.

Figure 2:
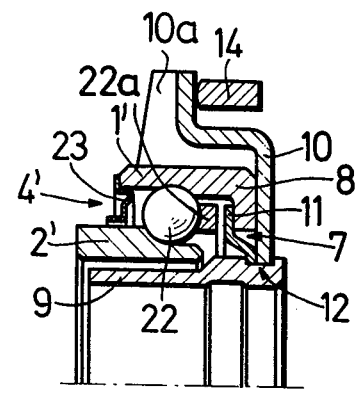

The clutch release bearing arrangement shown in FIG. 2 has a ball bearing assembly 4' whose bearing rings 1', 2' are similar to the afore-described rings 1, 2 and simultaneously engage bearing balls 22 secured in their circumferential relationship by a cage 22a. A guide face for the radial flange portion 8 of the outer bearing ring 1 is provided by the annular sheet metal member 10, and the ring 1 is axially secured by the flange portion 8 being received in a groove 7, open in a radially outward direction between the guide face of the annular member 10 and a corresponding radial face of a second, annular sheet metal member 11. The flange portion 8 appears as the shorter leg of the L-shape of the ring 1 in the axial section of FIG. 2, and is axially slightly narrower than the groove 7.

Respective inner mounting rims of the annular members 10, 11 are received by a shrink fit in axially abutting relationship in a shallow, annular, circumferential recess 12 of a carrier sleeve 9, analogous in structure and function to the sleeve 5 described with reference to FIG. 1. The radially outer portion of the member 11 is offset axially from the mounting rim so that the members 10, 11 diverge and the groove 7 is formed therebetween.

The radially outermost part 10a of the annular member 10 is axially offset from the guide face in a forward direction, that is, toward the clutch, not itself seen in FIG. 2, and provides an engagement face for a clutch release fork 14.

When the annular member 10 is shifted toward the left, as viewed in FIG. 2, by the fork 14, the exposed abutment face of the bearing ring 2' engages a diaphragm spring or clutch release levers of a friction clutch, not itself shown, in a conventional manner, and the flange portion 8 of the ring 1' may be shifted radially in the groove 7 for alignment of the bearing axis with the axis of rotation of the engaged clutch elements. The small axial clearance in the groove 7 is sufficient to minimize friction which may further be reduced by lubricants in an obvious manner. The proper alignment of the bearing assembly 4' with the rotating clutch elements reduces noises and wear of the ring 2' and of the engaged clutch elements.

Figure 3:
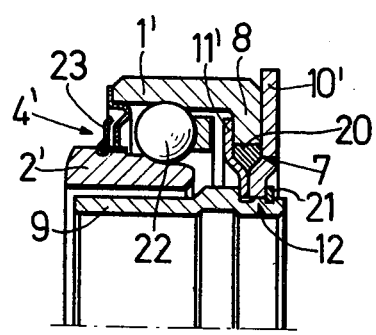

The modified clutch release bearing arrangement illustrated in FIG. 3 is laragely identical with that shown in FIG. 2 and corresponding elements have been provided with the same reference numerals. A retaining ring 21 is provided to bound the recess 12 in one axial direction and to facilitate installation of annular sheet metal members 10', 11'. The latter differ from their counterparts shown in FIG. 3 in diverging symmetrically in a radially outward direction so that respective parts of the two members constitute the bottom wall of the groove 7. The space in the groove 7 radially bounded by the bottom wall and the flange portion 8 of the outer ring 1' is filled with lubricating grease 20 of low viscosity so as to behave practically as a liquid.

The grease not only provides low friction between the axially engaged surfaces of the flange portion 8 and of the annular member 10' during clutch disengagement, but it also facilitates proper distribution of the stresses exerted by the non-illustrated, engaged clutch disengaging levers or the like on the ring 2' and damps radial oscillation of the bearing assembly 4', thereby further contributing to noiseless operation.

The apparatus illustrated in FIG. 4 is closely similar to that described above with reference to FIG. 3, but is provided with a resilient ring 13 located in the groove 7 and biasing the mounting portions of the annular members 10' 11' inward of the groove 12. The ring 13 may consist of lubricant-resisting, synthetic rubber or be a split ring of spring steel stressed in circumferential tension by contact with the annular members 10', 11'. It will be appreciated that the space radially bounded in the groove 7 by the flange portion 8 of the outer ring 1' and the bottom wall of the groove 7, but not occupied by the ring 13, is preferably filled with lubricating grease as is shown in FIG. 3, but has been omitted from FIG. 4 for the sake of clearer pictorial representation.

In the embodiments of the invention shown in FIGS. 2 to 4 an inner radial flange portion 8 of an outer bearing ring 1, 1' with axial and radial clearance extends into a groove 7 open in a radially outward direction between two annular members fixedly fastened on the carrier sleeve 9. However, the roles of the connected elements 8, 9 may be reversed without loss in function, as is shown in FIG. 5 to 7, which illustrate release bearing arrangements for use with clutches that are disengaged by movement of their release levers or diaphragm spring tongues in a direction opposite to that described with reference to FIG. 1.

The bearing assembly 4" seen in FIG. 5 has an inner bearing ring 2" equipped with outer radial abutment flange 24 for engagement with an the non-illustrated clutch release levers or their equivalents. The outer bearing ring 1" is L-shaped in the section of FIG. 5, but the shorter leg of the L-shape represents a radially outward projection providing an engagement face for a clutch release fork 14. The clutch is disengaged when the ring 1" is shifted toward the right, as viewed in FIG. 5, by the fork 14.

Two annular discs 10", 11" are secured in the outer bearing ring 1" between a shoulder of the ring and a retaining ring 21 and are held in loose abutting engagement with the shoulder and the ring 21 by an axially interposed flat disc 15 integral with an outer radial flange on a carrier sleeve 9'. There is enough radial clearance between the disc 15 and the bottom wall of the groove 7 axially bounded by the discs 10", 11" to permit the desired radial alignment movement of the bearing assembly 4" on the carrier sleeve 9', and enough axial clearance between the discs 10", 11", 15 not to hamper the radial movement by friction.

The clutch release fork 14 acts directly on the outer bearing ring 1", and no significant increase in contact pressure between the disc 15 and the disc 11" occurs while the bearing assembly 4" is shifted by the fork 14 for clutch disengagement. Only the minimal friction between the carrier sleeve 9' and the supporting tube 25, omitted from FIGS. 2 to 7 in order not to crowd the drawing, affects the engagement between the discs 10", 11", 15 and is insignificant.

The clutch release bearing arrangement shown in FIGS. 6 and 7 differs from the apparatus shown in FIG. 5 only in the specific configuration of the flange on the carrier sleeve 9".

A radially inner portion 17 of the flange part is integral with the cylindrically tubular part of the sleeve 9". The outer, axially extending face 18 of the flange portion 17 is spherically arcuate about a center located approximately in the axis of the sleeve 9'' and radially aligned with the face 18. It is conformingly engaged by a plastic ring 16 from which a disc-shaped, integral flange 15' extends into the groove 7' between the discs 10'', 11'''.

The coefficient of friction between steel and plastics is generally low and significantly lower than between two steel surfaces. Even without lubrication, there is no significant friction between the plastic ring 16 and the steel discs 10'', 11''', or between the ring 16 and the steel face 18. The bearing assembly 4'' thus may shift radially on the guide faces of the flange 15', and additionally, the bearing assembly 4'' together with the plastic ring 16 may tilt on the face 18 to compensate not only for radial misalignment between the axes of the bearing assembly 4'' and of the cooperating, non-illustrated clutch elements, but also to compensate for angular misalignment. As radial diplacement of the bearing assembly 4'' is limited by the depth of the groove 7', so the angular displacement of the bearing assembly together with the plastic ring 16 on the flange portion 17 is limited by two annular ridges 19 on the ring 16 which abut against radial faces of the flange portion 17 in the event of excessive tilting movement, particularly during transportation and during assembly of the apparatus with other elements of an automotive vehicle.

To permit the tilting movement of the bearing assembly 4'', it is necessary that the clutch release fork 14 be mounted on its non-illustrated support by means of a universal joint, such as a ball-and-socket joint, as is well known in itself and not illustrated since the fork as such does not constitute an element of this invention.

A radial misalignment of the carrier sleeve 9'' and of the non-illustrated rotating clutch elements causes continuous, radial, back-and-forth movement of the bearing assembly 4'' on the carrier sleeve 9''. Angular misalignment, when once corrected by an appropriate tilting movement of the ring on the face 18, causes no further relative movement of the ring 16 and the flange portion 17.

Misalignments of the type corrected by the clutch release bearing arrangements of the invention are fairly common though rarely severe. Yet, the self-aligning bearing arrangements of the invention operate at a significantly lower noise level than conventional clutch release bearings in many instances, and their useful average life, when considered under otherwise comparable conditions affecting war, is significantly longer.

While the invention has been described with reference to ball bearings, other bearing elements of circular cross section, such as rollers, may be substituted for the spherical elements illustrated and described without significantly affecting the operation.

It should be understood, therefore, that the foregoing disclosure relates only to preferred embodiments of the invention, and that it is inteded to cover all changes and and modifications of the examples of the invention herein chosen for the purpose of the disclosure which do not constitute departures from the spirit and scope of the invention set forth in the appended claims.

What is claimed is:

1. A clutch release bearing arrangement comprising:
   a. a first bearing ring having a first axis;
   b. a second bearing ring;
   c. a plurality of bearing elements of circular cross section angularly distributed about said axis and radially interposed between said bearing rings in simultaneous rolling engagement for rotation of said second bearing ring about said axis,
      1. said second bearing ring having an exposed abutment face extending radially relative to said axis,
   d. a carrier member having a second axis,
      1. said second bearing ring rotatably enveloping said carrier member with sufficient radial clearance for permitting joint radial movement of said bearing rings toward and away from a position in which said first and second axes coincide,
      2. respective portions of said first bearing ring and of said carrier member being axially coextensive and axially projecting beyond said second bearing ring in radially spaced relationship;
   e. groove bounding means on one of said portions bounding an annular groove about said axes in two opposite axial directions when said axes coincide, said groove being radially open toward the other one of said portions; and
   f. a flange radially projecting from said other portion and being received in said groove with sufficient axial clearance to guide said joint movement of said bearing members.

2. An arrangement as set forth in claim 1, wherein said bearing elements are spherical.

3. An arrangement as set forth in claim 1, wherein said other portion is of said first bearing ring, and said groove bounding means include two annular members fixedly fastened to said carrier member in axially offset relationship.

4. An arrangement as set forth in claim 3, wherein said carrier member is formed with a recess open in a radially outward direction, respective mounting portions of said annular members being received in said recess in axially abutting relationship, said annular members diverging axially from each other radially outward of said recess.

5. An arrangement as set forth in claim 4, further comprising resilient means in said groove biasing said mounting portions inward of said recess.

6. An arrangement as set forth in claim 3, wherein said annular members are spaced from said bearing elements in a common axial direction, one of said annular members being farther from said bearing elements than the other annular member and including engagement means for engagement by a clutch release fork.

7. An arrangement as set forth in claim 1, wherein said other portion is of said carrier member, and said groove bounding means include two annular members fixedly fastened to said first bearing ring in axially offset relationship.

8. An arrangement as set forth in claim 7, further comprising engaging means on said first bearing ring for engagement by a clutch release fork.

9. An arrangement as set forth in claim 7, wherein said flange projects from said carrier member in a radially outward direction and has two annular portions respectively near and remote from said second axis, said two annular portions movably engaging each other along an interface spherically arcuate about a center of curvature located substantially in said second axis.

10. An arrangement as set forth in claim 9, further comprising abutment means limiting axial displacement of said remote portion on said near portion.

11. An arrangement as set forth in claim 9, wherein respective engaged parts of said near and remote portions consist of metal and plastic.

12. An arrangement as set forth in claim 1, wherein said groove has a bottom wall closing said groove in a radial direction away from the received flange, and a body of substantially liquid material filling the space in said groove between said bottom wall and said flange.

13. An arrangement as set forth in claim 12, wherein said material is lubricating grease.

14. An arrangement as set forth in claim 1, wherein said groove bounding means include means closing said groove in a radial direction away from said other portion.

* * * * *